(12) United States Patent
Maas

(10) Patent No.: US 9,103,397 B2
(45) Date of Patent: Aug. 11, 2015

(54) DOUBLE SPRING FUNCTION UPHOLSTERED FURNITURE SPRING ASSEMBLIES

(75) Inventor: Patrick J. Maas, Dubuque, IA (US)

(73) Assignee: FLEXSTEEL INDUSTRIES, INC., Dubuque, IA (US)

( * ) Notice: Subject to any disclaimer, the term of this patent is extended or adjusted under 35 U.S.C. 154(b) by 1231 days.

(21) Appl. No.: 10/595,330

(22) PCT Filed: Oct. 4, 2004

(86) PCT No.: PCT/US2004/032960
§ 371 (c)(1),
(2), (4) Date: Apr. 10, 2006

(87) PCT Pub. No.: WO2005/034691
PCT Pub. Date: Apr. 21, 2005

(65) Prior Publication Data
US 2007/0040311 A1 Feb. 22, 2007

Related U.S. Application Data

(60) Provisional application No. 60/510,662, filed on Oct. 10, 2003.

(51) Int. Cl.
*F16F 3/00* (2006.01)
*F16F 1/18* (2006.01)
*A47C 7/02* (2006.01)
*A47C 7/28* (2006.01)
*B60N 2/70* (2006.01)
*B60N 2/72* (2006.01)
*A47C 23/02* (2006.01)

(52) U.S. Cl.
CPC ............... *F16F 1/185* (2013.01); *A47C 7/025* (2013.01); *A47C 7/285* (2013.01); *A47C 7/287* (2013.01); *B60N 2/7094* (2013.01); *B60N 2/72* (2013.01); *A47C 23/02* (2013.01); *F16F 1/187* (2013.01); *F16F 3/00* (2013.01)

(58) Field of Classification Search
CPC ............. F16F 1/18; F16F 1/185; F16F 1/187; F16F 3/00; A47C 7/025; A47C 7/28; A47C 23/02; A47C 23/12; A47C 23/30; B60N 2/7047
USPC ................. 267/110, 111, 112, 158, 160, 164; 297/452.49; 5/246, 247, 255
See application file for complete search history.

(56) References Cited

U.S. PATENT DOCUMENTS 1,948,130 A * 2/1934 Reed ............................... 267/95
2,608,265 A 8/1952 Eckert
2,788,844 A 4/1957 Crahan
(Continued)

OTHER PUBLICATIONS

Flexsteel Website pdf from http://www.flexsteel.com/index.do?id=12.*
(Continued)

*Primary Examiner* — Melody Burch
(74) *Attorney, Agent, or Firm* — Ladas & Parry LLP

(57) ABSTRACT

A double spring function seat spring assembly combines a U-shaped frame with a closed front, a number of leaf springs (26-28) connected between the front and a cross piece and a plurality of coil springs (36, 38, 40) supporting the cross piece from the frame, the leaf springs formed with a series of W and V arches to enable flexing and extension for improved durability and comfort.

14 Claims, 3 Drawing Sheets

(56) References Cited

U.S. PATENT DOCUMENTS

| | | | | |
|---|---|---|---|---|
| 2,818,105 | A | * | 12/1957 | Cumming et al. ............... 267/89 |
| 3,098,646 | A | * | 7/1963 | Knabusch et al. ............ 267/112 |
| 3,156,460 | A | * | 11/1964 | Santillo .......................... 267/102 |
| 3,173,672 | A | * | 3/1965 | Isaacs ............................ 267/102 |
| 3,185,466 | A | * | 5/1965 | Meyers .......................... 267/105 |
| 3,210,064 | A | * | 10/1965 | Crosby .......................... 267/103 |
| 3,248,745 | A | * | 5/1966 | Gunlock .................. 297/452.52 |
| 3,276,765 | A | * | 10/1966 | Slominski et al. ............ 267/111 |
| 3,768,795 | A | * | 10/1973 | Rathbun, Jr. .................. 267/103 |
| 4,815,717 | A | * | 3/1989 | Crosby .......................... 267/110 |
| 5,269,497 | A | * | 12/1993 | Barth ............................. 267/110 |
| 6,158,815 | A | * | 12/2000 | Sugie et al. .............. 297/452.61 |

OTHER PUBLICATIONS

DualFlex Article pdf of "Flexsteel Recliners Offer Steel-band Spring System" published by Furniture Today on Oct. 13, 2003.*
DualFlex Article Sep. 2003 through DualFlex Article Sep. 2003p. 4 pdfs of "Motion Furniture" published by Furniture Today on Sep. 29, 2003.*
Wayback Machine Search Results.*
Aug. 2003 Flexsteel Front Page.*
Aug. 2003 Flexsteel Quality Construction.*
Aug. 2003 Recliners.*
International Search Report of International Application No. PCT/US2004/32960, filing date Oct. 4, 2004. Date of completion Aug. 26, 2005, date of mailing Sep. 9, 2005.

* cited by examiner

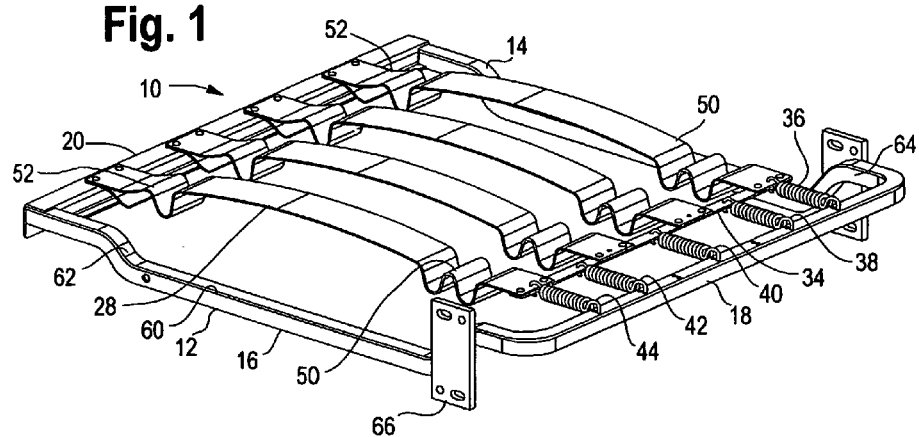
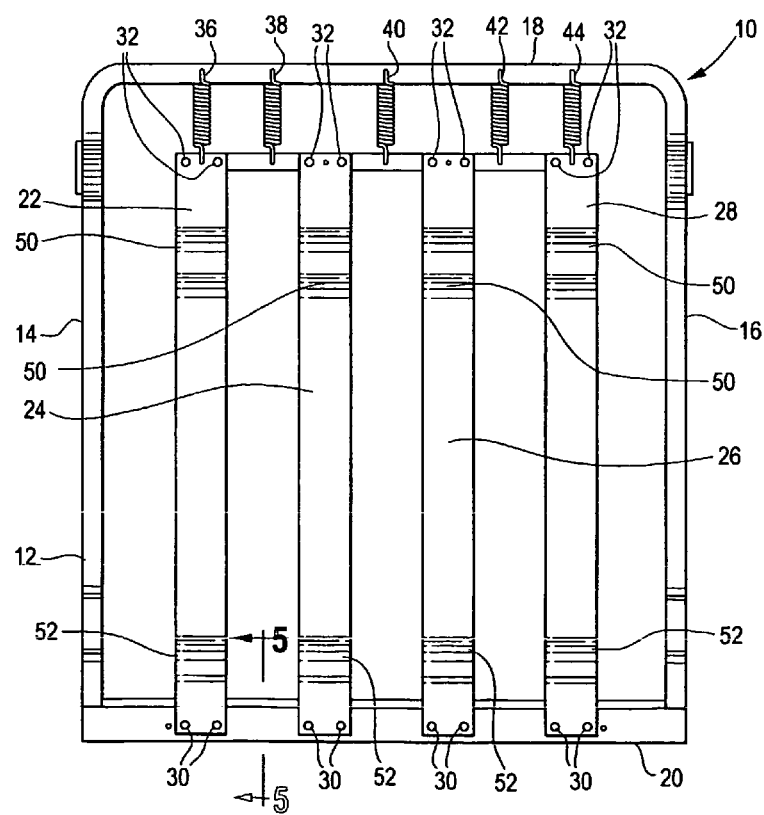

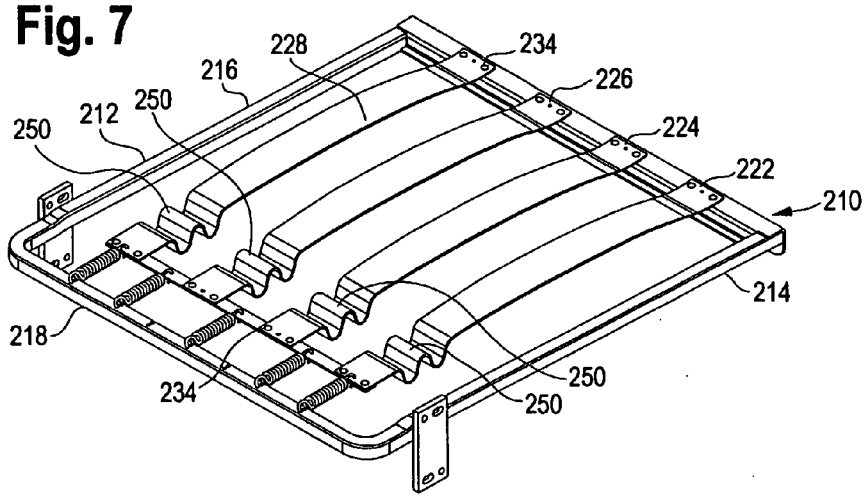
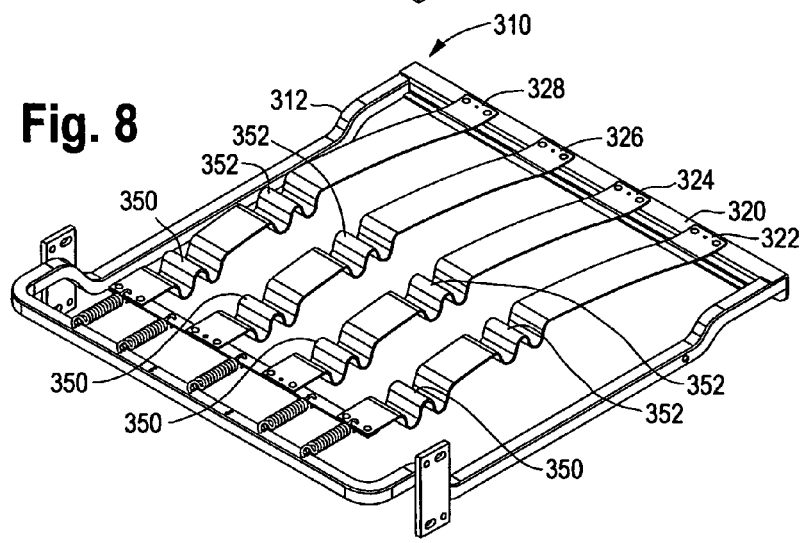
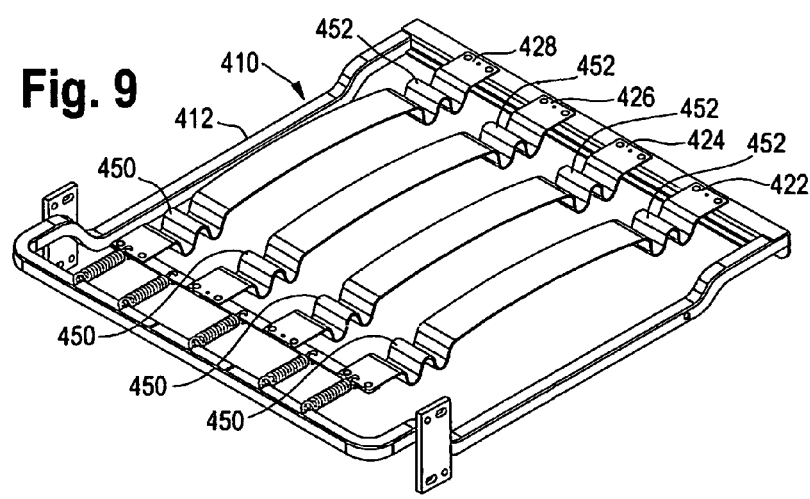

DOUBLE SPRING FUNCTION UPHOLSTERED FURNITURE SPRING ASSEMBLIES

BACKGROUND OF THE INVENTION

1. Field of the Invention

Leaf spring arrangements for upholstered furniture seating has advantages in strength, comfort and durability when compared to traditional coil or sinuous wire springs. Greater stability and control in the movement of the springs under load provide added durability for fabrics and upholstery. Because of the strength of the leaf springs, in some uses, additional flexing segments provide improved comfort and reduced metal fatigue thereby increasing both comfort and durability. Supporting a leaf spring array from a coil spring array maximizes comfort and durability by isolating fatigue and support and comfort related functions.

2. Description of Related Art

U.S. Pat. Nos. 2,788,844 and 3,156,460 show basic leaf spring structures used to support a seat deck in upholstered furniture. U.S. Pat. No. 5,269,497 shows a more recent improvement which includes a single V arch near the front and/or rear frame member of the leaf. The basic spring has the drawbacks of metal fatigue when the leaves are of small, very flexible dimensions when sized for greater flexibility and certain comfort parameters. Because of the stiffness of metal leaf springs, the area of the springs in the three patents mentioned is a relatively small percentage of the area of the seat deck, therefore the load is spread over a large number of small leaves. The single V-arch spring remedies the fatigue and durability issues to an extent, but still has a relatively small support area and has additional limitations in control of flexing on an overall seat spring assembly These patents are incorporated by reference as if fully set forth herein. Other patents have taught the use of coil spring supported bars, rods, or other seat decks, but not coil springs used in combination with leaf springs. The invention optimizes durability and comfort and provides improved utility in that a greater number of combinations of spring performance are available.

SUMMARY OF INVENTION

A new spring design in has a preferred and alternative embodiments as shown in the drawings. These include a U-shaped frame including sides and rear, a front member crossing the opening on the U, four leaf spring members riveted to the rear member and extending rearwardly joining to a cross piece with the cross piece suspended from the rear of the U-shaped member with five coil springs. The coil springs are generally disposed at either end and in the spaces between the four leaf springs.

In the preferred embodiment, one W arch is located at the rear of the leaf springs just before the ends where they are joined to the cross piece, and a V arch at the front of the leaf. The sides of the frame are formed with a dropped center position between front and rear downwardable depending segments for better clearance because of the more flexible springs.

In an alternative embodiment, a W arch is located at the rear of the flat or leaf springs just before the ends where they are joined to the cross piece, with the rest of the leaf flat.

In another alternative embodiment, one W arch is near the center and a second W arch near the rear. The second embodiment also has the sides formed with a dropped center position between front and rear downwardly depending segments for better clearance because of the more flexible springs.

Yet another alternative embodiment has the frame of the preferred and second embodiments, but has a W arch near the rear and a W arch near the front.

BRIEF DESCRIPTION OF DRAWING

FIG. 1 is a perspective view of the preferred embodiment of the spring assembly having a W arch and a V arch.

FIG. 2 is a top plan view of the preferred spring assembly.

FIG. 7 is a perspective view of an alternative embodiment of the spring assembly having a single W rear arch.

FIG. 8 is a perspective view of an alternative embodiment of the spring assembly having a rear W arch and a center W arch.

FIG. 9 is a perspective view of an alternative embodiment of the spring assembly having a rear W arch and a front W arch.

DESCRIPTION OF PREFERRED EMBODIMENTS

Figure 3:
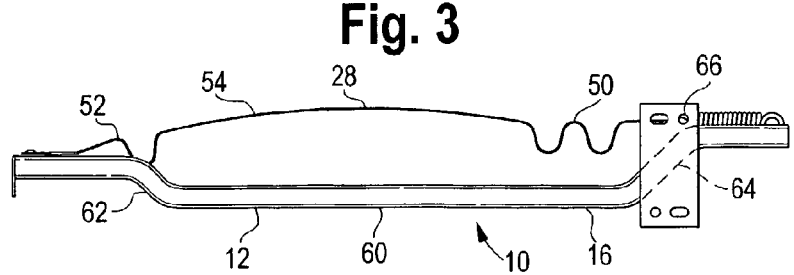
FIG. 3 is a side elevational view of the preferred spring assembly.
Figure 4:
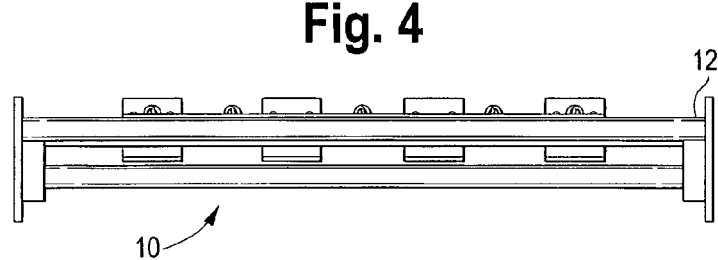
FIG. 4 is a rear elevational view of the preferred spring assembly.

The double spring function assembly 10 has a U-shaped frame 12 including first and second sides 14, 16 and rear portion 18 which crosses the base of the U. Front member 20 crosses the opening of the U. Four leaf springs 22, 24, 26, 28 are attached with rivets 30 to the front member 20 and extend rearwardly joining, preferably with rivets 32 to a cross piece 34. The cross piece 34 is suspended from the rear of the U-shaped member 12 with five coil springs 36, 38, 40, 42 and 44. The coil springs 36, 38, 40, 42 and 44 are disposed at either end of cross piece 34 and in the spaces between the four leaf springs 22, 24, 26, 28.

In the preferred embodiment, one W arch 50 is located at the rear of each leaf spring 22, 24, 26, 28 just before the ends where they are joined to the cross piece, and a V arch 52 at the front of the leaf. A substantially flat, but slightly bowed, portion 54 extends between arch 50 and arch 52.

The sides 14, 16 are formed with a dropped center portion 60 between front and rear downwardly depending segments 62, 64 for better seat deck clearance because of the more flexible springs. Adjacent rear downwardly depending segment 64 on each side 14, 16 are mounting plates 66. Plates 66 enable mounting of the spring assembly 10 to seat arms in the preferred embodiment. In other embodiments similar structure may be used for connection to mechanisms or seat backs. Plate 66 is cutaway in FIG. 3 for better visibility.

Figure 5:
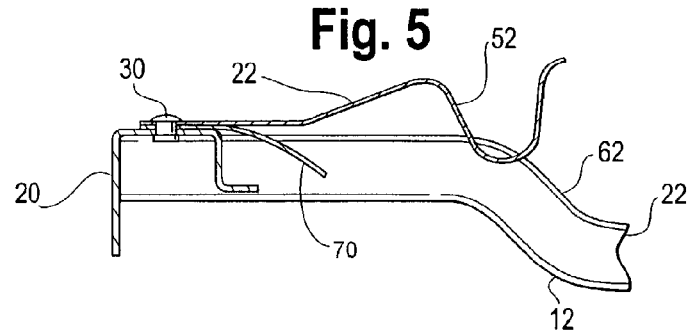
FIG. 5 is a sectional view of the front of the preferred embodiment showing a helper spring.

FIG. 5 is an enlarged sectional view of the front of the assembly 10. In this view will be seen, in addition to spring 22 a helper spring 70 is visible. As spring 20 flexes, helper spring 70 provides additional support and spreads the load on spring 22 over a broader area than the point of contact with cross member 34 which would occur in the absence of helper spring 70. Spring 70 has a first leg sandwiched between spring 22 and cross piece 34 and an angled second leg that projects inwardly, in the same direction as the axis of spring 22, and downwardly. Spring 70 provides and additional stress and fatigue reduction over the prior art. Both spring 22 and spring 70 are fastened to cross piece 20 with rivet 30. These components are used in association with each leaf spring of the invention.

Figure 6:
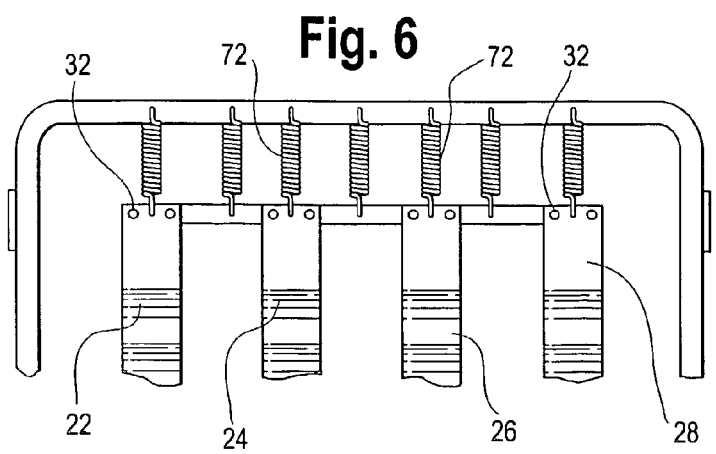
FIG. 6 is a partial plan view of the rear of the preferred embodiment modified as a heavy duty spring unit.

An additional variation shown in FIG. 6 accommodates heavier duty springs. Additional holes are shown in FIG. 2 in the ends of springs 24 and 26 which also correspond to holes in cross piece 34. This would permit adding additional coil springs 72 for a heavier duty spring unit.

In an alternative embodiment 210, in FIG. 7, a W arch 250 is located at the rear of the leaf springs 222, 224, 226, 228, near the ends where leaf springs 222, 224, 226, 228 are joined to the rear cross piece 234, with the rest of the leaf flat. Frame 212 has a substantially flat top with sides 214, 216, rear 218 and front 220 in the same plane. This has advantages in economy of manufacture and in certain applications where a base or mechanism may indicate avoidance of the dropped side version of the preferred embodiment. The front flat portions of the leaves provide greater support for the occupant of the seat at the front where it is preferred. This alternative embodiment support for the seating deck from leaves 222, 224, 226, 228, greater than in the prior art, the comfort of the furniture and fatigue on the metal improved which are over the prior art. Greater improvements in comfort, fatigue resistance and clearance by the frame are demonstrable, such as in the preferred embodiment.

In FIG. 8 another alternative embodiment, 310, one W arch 350 is near the rear and a second W arch 352 near the center of the leaf springs 322, 324, 326, 328. This embodiment also has the frame 312 formed in the manner of the preferred embodiment of FIG. 1-4, with the sides having a dropped center portion between front and rear downwardly depending segments for better clearance because of the more flexible springs. Because these features have already been described with reference to FIG. 1-4 they are not separately pointed out here. Spacing arches 350, 352 enables a softer seat, with flexibility in the rear and center and greater support at the front. Fatigue in leaf springs can nevertheless occur and tends to be focused near the attachment to front 320.

In FIG. 9 yet another alternative embodiment 410 has the frame 412 of the preferred and second embodiments, but has a W arch 450 near the rear and a W arch 452 near the front of springs 422, 424, 426 and 428. This provides greater flexibility and fatigue resistance, having flexibility at the front and rear of leaves 422, 424, 426, 428, however it is believed that comfort will be greater with a slightly more firm front portion in accordance with the preferred embodiment.

The embodiments are believed most suitable for a recliner suspension seat spring assembly 10, 210, 310, 410. However, modifications for other chairs, sofas, loveseats, recreational vehicle or marine seats, or the like could be made preserving the double functioning spring properties, without departing from the invention.

The suspension portion of this spring unit comprises leaf springs 22, 24, 26, 28, 222, 224, 226, 228, 322, 324, 326, 328, 422, 424, 426, 428, uses these leaf springs to both give support to seat foam and to enable extension as an occupant sits in the seat or chair. For the standard width recliner chair five (5) 12×17 coil extension springs 36, 38, 40, 42, 44 and corresponding coils springs in assemblies 210, 310, 410, anchor from the back of the seat frame 12, 212, 312, 412, to the back of the spring suspension and support assembly. Cross piece 34 and corresponding cross pieces in assemblies 210, 310, 410, would preferably be made of 0.06×0.59 wide spring material to allow flex and is anchored to and ties each of the individual flat springs 22, 24, 26, 28, 222, 224, 226, 228, 322, 324, 326, 328, 422, 424, 426, 428, together at the end where the extension springs attach. As discussed above, additional springs 72 may be added to any of these embodiments, to provide a heavier duty spring assembly.

While the above dimensions are preferred, other dimensions may be suitable depending on the particular seat and the materials used. The invention utilizes leaf springs 22, 24, 26, 28, 222, 224, 226, 228, 322, 324, 326, 328, 422, 424, 426, 428, whose flat area comprises a substantial portion of the area of the seat deck in a small number of springs, when compared to the prior art which uses many narrower leaf springs or even more wire springs.

W arches 50, 250, 252, 350, 352, 450, 452 and V arches 52 formed in the locations described relative to the ends of the flat portion of the seat springs 22, 24, 26, 28, 222, 224, 226, 228, 322, 324, 326, 328, 422, 424, 426, 428, provide a suspension having two markedly different flexing properties.

These flat springs 22, 24, 26, 28, 222, 224, 226, 228, 322, 324, 326, 328, 422, 424, 426, 428, are preferably made out of 0.026×2.0 inches wide spring material to provide good support to the foam cushion and have, aligned as described relative to the ends of the flat spring a 1.125 deep-formed W. Each formed W provide 5 formed radii that can flex. These W's not only flex to provide extension but also to accommodate twisting of these flat springs—which are wider than the prior art—to best follow the contour of the seat foam for maximum occupant seating comfort. Having the W's, aligned as described relative to the ends of the spring allow the flat spring material to flex without setting up fatigue stresses at the ends of the flat springs thereby promoting for long life.

Comparing the seat deck area defined by the cross piece 34, the outer edges of springs 22, 28 and the spring ends riveted to front 20, to the area of springs themselves, one sees that nearly half the seat deck area is actually filled by the surfaces of the springs 22, 24, 26, 28. By comparison, the spring unit in U.S. Pat. No. 5,269,479, having paired, narrower leaf springs has closer to only a third of the seat deck area filled by the surfaces of the springs. When supporting flexible materials such as the foams and fabrics of upholstery, supporting the foam over a larger relative surface area provides increased durability, while the dual functioning spring properties, including the combination of W and/or V arches provides a combination of improved metal durability with superior comfort.

While several embodiments have been shown and described with respect to the present invention, it should be understood that the present invention is not limited to these embodiments, but rather is susceptible to numerous changes and modifications as known to those skilled in the art. Therefore, we do not wish to be limited to the detail shown and described herein, and intend to cover all such changes and modifications as are encompassed by the scope of the claims.

I claim:

1. A seat spring assembly for a seat base for supporting a sitting load comprising:
   a frame having a first and a second frame end with first and second sides connected to the first and second transverse frame ends;
   a plurality of flat leaf springs having leaf spring first ends connected to the first frame end and leaf spring second ends connected to the second frame end;
   each leaf spring having one V arch adjacent the leaf spring first end and one W arch adjacent the leaf spring second end;
   said V arch being oriented on a first vertical axis so that it opens upwardly and said W arch being formed in two segments, each segment being oriented on a second and third vertical axis so that said W arch opens upwardly;

each leaf spring has a substantially flat center portion extending longitudinally and aligned horizontally to define a seating support surface upon which said load is borne;

said V arch and said W arch flexing in response to said sitting load wherein said load is substantially aligned with said first, second and third vertical axes;

a cross piece, said cross piece spanning and substantially perpendicularly interconnecting said leaf spring second ends, said leaf spring second ends being attached to said cross piece so that said flat leaf springs are supported solely at said first and second ends; and a plurality of coil springs, said coil springs connecting said cross piece to said second frame end to transmit loads from said interconnected leaf springs through said coil springs to said second frame end.

2. A seat spring assembly for a seat base comprising:

a frame having a first and a second frame end with first and second sides connected to the first and second transverse frame ends;

a plurality of flat leaf springs having leaf spring first ends connected to the first frame end and leaf spring second ends connected to the second frame end;

each leaf spring having one V or W arch adjacent the leaf spring first or second end;

each leaf spring has a substantially flat center portion extending longitudinally and aligned horizontally to define a seating support surface;

a cross piece, said cross piece spanning and interconnecting said leaf spring second ends, said leaf spring second ends being attached to said cross piece; and a plurality of coil springs, said coil springs connecting said cross piece to said second frame end to transmit loads from each of said leaf springs through each of said coil springs and second cross piece to said second frame end;

the leaf spring has said substantially flat center portion bowed and extending between the V and W arches;

there are 3 to 6 leaf springs for each seating position and a helper spring is attached to at least two of every 4 leaf springs, said helper spring having a fixed end and a free end, with a spring body therebetween, and being attached at the fixed end of the helper spring between the respective first leaf spring end of its respective leaf spring and the first frame end, and the helper spring free end projecting below its respective leaf spring in a cantilevered fashion and extending for a length less than the length of the leaf spring, wherein each of said helper springs provide additional resilience when said body contacts each of said leaf springs.

3. A seat spring assembly for a seat base adapted to support a sitting load comprising:

a frame having a first and a second frame end with first and second sides connected to the first and second transverse frame ends;

a plurality of flat leaf springs having leaf spring first ends connected to the first frame end and leaf spring second ends connected to the second frame end, said leaf springs having top and bottom surfaces and first and second side edges;

each leaf spring having one V arch adjacent and spaced inwardly from the respective leaf spring first end of each leaf spring, with the V opening upwardly, and one W arch adjacent and spaced inwardly from the leaf spring second end, with the W opening upwardly, wherein the side edges remain substantially parallel to one another in the V arch and W arch and each of the leaf springs flexes responsive to the sitting load whereby the V arch and W arch tend to open responsive to the load and close as the load is released;

each leaf spring has a substantially flat center portion extending longitudinally between the V arch and W arch and aligned horizontally to define a seating support surface, and said flat center portion flexes responsive to the load;

a cross piece, said cross piece spanning and substantially perpendicularly interconnecting said leaf spring second ends, said leaf spring second ends being attached to said cross piece; and a plurality of coil springs, said coil springs connecting said cross piece to said second frame end to transmit loads from said interconnected leaf springs through said coil springs to said second frame end.

4. The seat spring assembly of claim 1 or 3 wherein each leaf spring has said substantially flat center portion bowed and extending between said V and W arches.

5. The seat spring assembly of claim 1 wherein there are 3 to 6 leaf springs for each seating position and a helper spring is attached to at least two of every 4 leaf springs, said helper spring being attached at one helper spring end between its respective first leaf spring end and the first frame end, and the helper spring other end projecting below its respective leaf spring and extending for a length less than the length of its respective leaf spring.

6. The seat spring assembly of claim 1, or 3 wherein the W arches when present have radii that permit each of such leaf springs to flex to extend each of such leaf springs and to accommodate twisting of each of such leaf springs.

7. The seat spring assembly of claim 1, 2 or 3 wherein there are 4 leaf springs for each seating position and the first and second sides of the frame are formed with a dropped center position between front and rear downwardly depending segments for clearance.

8. The seat spring assembly of claim 1, 2 or 3 wherein the frame is a U-shaped frame having first and second sides interconnected by said second end at the bottom of the U, and the first end crosses the opening on the U;

the leaf springs are formed and arranged to have said W arch located proximate the frame first second ends where the leaf springs are joined to the cross piece, and/or said V or W arch proximate the first leaf end; and said substantially flat center portion is slightly bowed and extends between said W arch and said W arch.

9. The seat spring assembly of claim 1 or 3 wherein a helper spring is mounted in association with each of said leaf springs and each of said leaf spring first ends, said helper spring having a first leg sandwiched between its respective leaf spring and said first end and an angled second leg that projects inwardly, in the same direction as the axis of its respective leaf spring, and downwardly, so that as leaf spring flexes, the helper spring free end makes contact and thereby provides additional support and spreads the load on the said leaf spring with which said helper spring is associated over a broader area than the point of contact with the cross piece that would not occur in the absence of said helper spring; and adjacent rear downwardly depending mounting plates on each of said sides, said plates enabling mounting of the spring assembly to seat arms or for connection to mechanisms or seat backs.

10. The seat spring assembly of claim 1, 2 or 3 wherein one of said coil springs is attached to each leaf spring end to provide a heavier duty spring unit.

11. The seat spring assembly of claim 1, 2 or 3 wherein each W arch is formed and arranged with five formed radii that can flex to provide extension and accommodate twisting of said leaf springs which leaf springs are sufficiently wide to best follow the contour of the seat cushion for maximum occupant seating comfort, and allow the flat leaf spring material to flex without setting up fatigue stresses at the ends of said leaf springs.

12. The seat spring assembly of claim 1 or 3 wherein:
said coil springs are generally disposed at the end of each of said leaf springs and in the spaces between said leaf springs;
a helper spring is attached to each of said leaf springs between its respective first leaf spring end and the first frame end, and each of the helper springs extends below its respective leaf spring for a length less than the length of its respective leaf spring, wherein each of said helper springs has a fixed end and a free end; and
each of said leaf springs has said substantially flat portion bowed.

13. The seat spring assembly of claim 3 wherein there are 3 to 6 leaf springs for each seating position and a helper spring is attached to at least two of every 4 leaf springs, said helper spring being attached at one helper spring end between its respective first leaf spring end and the first frame end, and the helper spring other end projecting below its respective leaf spring and extending for a length less than the length of its respective leaf spring.

14. The seat spring assembly of claim 1, wherein the V arch is spaced inwardly from the leaf spring first end and the W arch is spaced inwardly from the leaf spring second end.

* * * * *